United States Patent
Zirphile et al.

(10) Patent No.: US 10,333,665 B2
(45) Date of Patent: Jun. 25, 2019

(54) METHOD AND SYSTEM FOR WIRELESS COMMUNICATION BETWEEN TERMINALS AND HALF-DUPLEX BASE STATIONS

(71) Applicant: SIGFOX, Labege (FR)

(72) Inventors: Lionel Zirphile, Ramonville Saint Agne (FR); Nicolas Chalbos, Eaunes (FR); Christophe Fourtet, Pompignan (FR)

(73) Assignee: SIGFOX, Labege (FR)

( * ) Notice: Subject to any disclaimer, the term of this patent is extended or adjusted under 35 U.S.C. 154(b) by 150 days.

(21) Appl. No.: 15/551,155

(22) PCT Filed: Feb. 19, 2016

(86) PCT No.: PCT/FR2016/050383
§ 371 (c)(1),
(2) Date: Aug. 15, 2017

(87) PCT Pub. No.: WO2016/132081
PCT Pub. Date: Aug. 25, 2016

(65) Prior Publication Data
US 2018/0062803 A1     Mar. 1, 2018

(30) Foreign Application Priority Data
Feb. 19, 2015   (FR) ..................................... 15 51394

(51) Int. Cl.
*H04L 5/00*     (2006.01)
*H04W 28/06*     (2009.01)
(Continued)

(52) U.S. Cl.
CPC ......... *H04L 5/0037* (2013.01); *H04B 7/2656* (2013.01); *H04L 5/0005* (2013.01);
(Continued)

(58) Field of Classification Search
None
See application file for complete search history.

(56) References Cited

U.S. PATENT DOCUMENTS

| 6,130,914 | A | 10/2000 | Smithers |
| 9,000,350 | B1 * | 4/2015 | Tiana ................. H04N 1/00127 250/214.1 |

(Continued)

OTHER PUBLICATIONS

Do et al., "On the benefits of random FDMA schemes in ultra narrow band networks," 2014 12th International Symposium on Modeling and Optimization in Mobile, ad hoc, and Wireless Networks (WIOPT), May 12, 2014, pp. 672-677.
(Continued)

*Primary Examiner* — Andrew C Oh
(74) *Attorney, Agent, or Firm* — IM IP Law; C. Andrew Im; Chai Im (57) ABSTRACT

A wireless communication method between a plurality of terminals and an access network. The access network is configured to transmit downlink messages on a downlink in reply to uplink messages transmitted by the terminals. The access network includes a plurality of half-duplex base stations. Each terminal waiting for a downlink message in reply to a transmitted uplink message is configured to listen to the downlink in a listening window, the duration of which is at least five times that of the downlink message. The method includes the steps of determining if listening windows of terminals overlap. When an overlap allows the transmission of several downlink messages by a single base station, the downlink messages are transmitted grouped together in a single transmission window of the base station.

15 Claims, 2 Drawing Sheets

(51) Int. Cl.
*H04B 7/26* (2006.01)
*H04W 72/04* (2009.01)
*H04L 5/16* (2006.01)

(52) U.S. Cl.
CPC ..... *H04W 28/065* (2013.01); *H04W 72/0473* (2013.01); *H04L 5/16* (2013.01)

(56) References Cited

U.S. PATENT DOCUMENTS

| | | | | |
|---|---|---|---|---|
| 9,210,607 | B2* | 12/2015 | Huang | H04W 28/0215 |
| 2002/0193989 | A1* | 12/2002 | Geilhufe | G10L 15/26 |
| | | | | 704/208 |
| 2008/0081598 | A1* | 4/2008 | Chandra | H04W 48/12 |
| | | | | 455/414.1 |
| 2011/0243051 | A1* | 10/2011 | Kenchareddy | H04W 36/0007 |
| | | | | 370/312 |
| 2012/0084438 | A1* | 4/2012 | Raleigh | H04L 41/046 |
| | | | | 709/224 |
| 2012/0131176 | A1* | 5/2012 | Ferris | G06F 9/5072 |
| | | | | 709/224 |
| 2013/0083722 | A1* | 4/2013 | Bhargava | H04W 48/20 |
| | | | | 370/315 |
| 2013/0235776 | A1* | 9/2013 | Park | H04W 52/0229 |
| | | | | 370/311 |
| 2014/0075567 | A1* | 3/2014 | Raleigh | H04W 12/10 |
| | | | | 726/26 |
| 2014/0128059 | A1* | 5/2014 | Tronc | H04B 7/18513 |
| | | | | 455/428 |
| 2014/0140328 | A1* | 5/2014 | Ling | H04W 56/001 |
| | | | | 370/336 |
| 2014/0321376 | A1* | 10/2014 | Damnjanovic | H04W 72/1215 |
| | | | | 370/329 |
| 2015/0038179 | A1* | 2/2015 | Mohanty | H04W 4/70 |
| | | | | 455/458 |
| 2015/0215867 | A1* | 7/2015 | Choi | H04W 48/14 |
| | | | | 370/311 |
| 2015/0245296 | A1* | 8/2015 | Tyson | H04L 43/065 |
| | | | | 370/311 |
| 2016/0306824 | A1* | 10/2016 | Lopez | G06T 3/4092 |

OTHER PUBLICATIONS

Zhang, "Efficient Communication Method for Sensor and Sensor Networks," 2011 International Conference on Future Computer Science and Application (ICFCSA), Jun. 18, 2011, pp. 101-104, IEEE.

* cited by examiner

METHOD AND SYSTEM FOR WIRELESS COMMUNICATION BETWEEN TERMINALS AND HALF-DUPLEX BASE STATIONS

RELATED APPLICATIONS

This application is a § 371 application from PCT/FR2016/050383 filed Feb. 19, 2016, which claims priority from French Patent Application No. 15 51394 filed Feb. 19, 2015, each of which is incorporated herein by reference in its entirety.

TECHNICAL FIELD

The present invention belongs to the field of digital telecommunications, and more particularly relates to a method and a system for wireless communication between terminals and an access network.

BACKGROUND OF THE INVENTION

The present invention is used particularly advantageously, albeit without any kind of limitation, in ultra-narrowband wireless communication systems. The term "ultra-narrowband" (UNB) is understood to mean that the instantaneous frequency spectrum of the radio signals transmitted by the terminals has a frequency width of less than one kilohertz.

Such UNB wireless communication systems are particularly suitable for M2M (machine-to-machine) applications or for applications related to the Internet of things (IoT).

In such a UNB wireless communication system, data exchanges are essentially unidirectional, in this case over an uplink between terminals and an access network of said system.

The terminals transmit uplink messages that are collected by base stations of the access network, without having to associate themselves beforehand with one or more base stations of the access network. Stated otherwise, the uplink messages transmitted by a terminal are not intended for one specific base station of the access network, and the terminal transmits its uplink messages under the assumption that they will be able to be received by at least one base station. Such arrangements are advantageous in that the terminal does not need to make regular measurements, which are intensive particularly from the point of view of power consumption, in order to determine the most appropriate base station to receive its uplink messages. The complexity is on the access network, which needs to be capable of receiving uplink messages that can be transmitted at arbitrary times and at arbitrary center frequencies. Each base station of the access network receives uplink messages from the various terminals that are within its range.

Such a mode of operation, in which data exchanges are essentially unidirectional, is entirely satisfactory for many applications, such as, for example, remote reading of gas, water and electricity meters, remote surveillance of buildings or houses, etc.

In some applications, however, it may be advantageous to be able also to exchange data in the other direction, namely over a downlink from the access network to the terminals, for example in order to reconfigure a terminal and/or control an actuator connected to said terminal. However, it is necessary to provide such a capability while limiting the impact on the power consumption of the terminals.

U.S. Pat. No. 6,130,914 describes an exemplary bidirectional UNB wireless communication system making it possible to limit the impact on the power consumption of the terminals.

Specifically, in U.S. Pat. No. 6,130,914, a downlink message is transmitted to a terminal within a listening window that is predetermined with respect to an uplink message transmitted by said terminal. More particularly, after having transmitted an uplink message, a terminal switches to a standby (or power-saving) mode for a standby window of predetermined duration. At the end of said standby window, the terminal leaves standby mode in order to listen to the downlink during a listening window of limited duration, while awaiting a downlink message transmitted by a base station.

On the access network side, the listening windows of the various terminals may be determined on the basis of uplink messages received by these terminals, and the access network must organize the transmission of the downlink messages so that they may be received, by the corresponding terminals, within the respective listening windows of said terminals.

Because the terminals listen to the downlink only for predetermined listening windows, the additional power consumption required for the reception of downlink messages is limited, and said terminals may be in standby mode most of the time. Furthermore, because they do not have to transmit and receive simultaneously, such terminals may be half-duplex terminals and may therefore be inexpensive to manufacture.

Additionally, since the terminals are not previously associated with particular base stations, the access network does not know which terminals are within range of the various base stations. This problem is also solved since a terminal listens only after having transmitted an uplink message, such that it is sufficient to use a base station having received said uplink message for the purpose of transmitting the downlink message to this terminal.

However, for such bidirectional UNB wireless communication systems, it is also desirable, in particular for reasons related to the cost of deployment of the access network, to use half-duplex base stations, i.e. base stations that are able to receive uplink messages and transmit downlink messages, but not simultaneously. In such a case, it is understood that a base station that switches to a transmission mode, in order to transmit a downlink message to a terminal, is no longer available for receiving uplink messages transmitted by other terminals, such that numerous uplink messages may thus be missed.

SUMMARY OF THE INVENTION

An aim of the present invention is to overcome all or some of the limitations of the solutions of the prior art, in particular those set out above, by proposing a solution that makes it possible to have bidirectional data exchanges while limiting the durations for which the various base stations of the access network are unavailable for reception.

To this end, and according to a first aspect, the invention relates to a method for wireless communication between a plurality of terminals and an access network, said terminals asynchronously transmitting uplink messages over an uplink to the access network, said access network being configured to transmit downlink messages over a downlink in response to all or some of the uplink messages, said access network including a plurality of base stations that are configured to transmit downlink messages within transmission windows in which said base stations are not able to receive uplink messages. Each terminal awaiting a downlink message in response to a transmitted uplink message being configured to listen to the downlink during a listening window that is predetermined with respect to said uplink message, the duration of said listening window being at least five times longer than the duration of the downlink message, the method includes steps of:
- determining whether listening windows of terminals awaiting downlink messages exhibit overlap;
- when there is an overlap suitable for the transmission of multiple downlink messages by one and the same base station: said downlink messages, grouped together within one and the same transmission window of said base station, are transmitted within said overlap.

Thus, the terminals listen to the downlink during a listening window that is much longer in duration than necessary for receiving the downlink messages. Such arrangements make it possible to increase the probability of having listening windows of different terminals which partially overlap, and hence to increase the probability of being able to group together the downlink messages that are intended for these terminals and to transmit them by means of one and the same base station.

When an overlap between listening windows of different terminals allows the transmission of corresponding downlink messages by one and the same base station, then said downlink messages are advantageously grouped together within one and the same transmission window of said base station. Thus, the duration for which the base station is unavailable for reception may be limited. Specifically, the duration for which a base station is unavailable for reception is determined by the duration of the transmission windows, but also by the durations of toggling from a reception mode of said base station to a transmission mode, and vice versa. By configuring a single transmission window to transmit multiple downlink messages, the number of operations of toggling between reception mode and transmission mode is greatly decreased, along with the associated duration of unavailability for reception.

In particular modes of implementation, the wireless communication method may additionally include one or more of the following features, either taken in isolation or according to any of the technically possible combinations.

In particular modes of implementation, when downlink messages are transmitted grouped together within one and the same transmission window of a base station, at least two downlink messages are transmitted simultaneously at different respective center frequencies.

Such arrangements allow the duration for which the base stations are unavailable for reception to be further decreased. Specifically, by transmitting the downlink messages simultaneously (i.e. with a non-zero temporal overlap between said downlink messages), then the duration required to transmit said downlink messages is substantially shorter than the sum of the respective durations of said downlink messages.

In particular modes of implementation, the center frequency of a downlink message transmitted in response to an uplink message is determined according to the center frequency of said uplink message.

In particular modes of implementation, when downlink messages are transmitted grouped together within one and the same transmission window of a base station, at least two downlink messages are transmitted in succession.

Thus, the downlink messages may also be grouped together temporally (i.e. transmitted in succession, without temporal overlap). Such arrangements may prove to be advantageous, in particular, when two downlink messages must be transmitted at the same center frequency and as such may not be transmitted simultaneously. Such arrangements may also prove to be advantageous for limiting the instantaneous power of the radio signals transmitted by the base station, or for transmitting downlink messages more easily using different respective communication protocols, etc.

In particular modes of implementation, when multiple downlink messages may be grouped together within one and the same transmission window of a base station, said downlink messages are grouped together in frequency, i.e. transmitted simultaneously at different respective center frequencies, as long as the total instantaneous power of said downlink messages that are grouped together in frequency is lower than a predefined maximum power, then they are grouped together temporally, i.e. transmitted in succession if said total instantaneous power of said downlink messages grouped together in frequency becomes higher than said maximum power.

Thus, the total instantaneous power may be kept below a predefined maximum power for the duration of the transmission window (for example in order to comply with regulatory constraints), while minimizing the duration for which the base station is unavailable for reception, by favoring, when possible, the grouping in frequency of downlink messages with respect to the temporal grouping.

In particular modes of implementation, when downlink messages are transmitted grouped together within one and the same transmission window of a base station, at least one downlink message is transmitted with a bit rate that is higher than the bit rate of the uplink message in response to which said downlink message is transmitted.

Such arrangements allow the duration for which the base station is unavailable for reception to be further decreased. Specifically, by transmitting one, or preferably each, downlink message with a bit rate that is higher than the bit rate of the uplink messages, then the duration of transmission of the downlink messages will be decreased in comparison with what it would have been if the same bit rate as for the uplink messages had been used.

In particular modes of implementation, the wireless communication system also including multiple terminals, referred to as "asynchronous reception terminals", which are suitable for receiving downlink messages at any time, said method includes, when a downlink message must be transmitted to an asynchronous reception terminal, steps of:
- determining whether said downlink message may be transmitted by a base station scheduled for transmitting a downlink message in response to an uplink message transmitted by a terminal referred to as a "synchronous reception terminal";
- when said downlink message intended for the asynchronous reception terminal may be transmitted by the base station scheduled for transmitting a downlink message to a synchronous reception terminal: said downlink messages, grouped together within one and the same transmission window, are transmitted from said base station.

Thus, multiple types of terminals may coexist in the wireless communication system:
- synchronous reception terminals, i.e. terminals that may receive downlink messages only within listening windows that are predetermined with respect to uplink messages that they have transmitted;
- asynchronous reception terminals, which may receive downlink messages at any time.

In such a case, it is possible to group together, for a transmission in one and the same transmission window of a base station, downlink messages intended for synchronous reception terminals and downlink messages intended for asynchronous reception terminals.

According to a second aspect, the present invention relates to a terminal of a wireless communication system, said terminal being suitable for transmitting uplink messages over an uplink to an access network, said access network being suitable for transmitting downlink messages over a downlink to said terminal in response to all or some of the uplink messages, said terminal being configured, once it has transmitted an uplink message in response to which the access network must transmit a downlink message, to listen to the downlink, in order to receive the downlink message, during a listening window that is predetermined with respect to said uplink message. According to the invention, the duration of the listening window is at least five times longer than the duration of the downlink message.

In particular embodiments, the terminal is configured, once it has transmitted an uplink message in response to which the access network must transmit a downlink message, to switch to a standby mode for a standby window of predetermined duration and, after the standby window, to listen to the downlink during the listening window.

According to a third aspect, the present invention relates to an access network of a wireless communication system including a plurality of base stations that are configured to transmit radio signals within transmission windows in which said base stations are not able to receive radio signals. Said system including a plurality of terminals according to any one of the modes of implementation of the invention, said terminals asynchronously transmitting uplink messages over the uplink, the access network is additionally configured:

to determine whether listening windows of terminals awaiting downlink messages exhibit overlap;
when there is an overlap suitable for the transmission of multiple downlink messages by one and the same base station: to transmit said downlink messages, grouped together within one and the same transmission window of said base station, within said overlap.

In particular embodiments, the access network may additionally include one or more of the following features, either taken in isolation or according to any of the technically possible combinations.

In particular embodiments, when downlink messages are transmitted grouped together within one and the same transmission window of a base station, at least two downlink messages are transmitted simultaneously at different respective center frequencies.

In particular embodiments, the center frequency of a downlink message transmitted in response to a received uplink message is determined according to the center frequency, measured by said access network, of said received uplink message.

In particular embodiments, when downlink messages are transmitted grouped together within one and the same transmission window of a base station, at least two downlink messages are transmitted in succession.

In particular embodiments, each base station is configured to operate by default in a reception mode, in which said base station may receive uplink messages but may not transmit downlink messages.

According to a fourth aspect, the present invention relates to a wireless communication system including a plurality of terminals according to any one of the embodiments of the invention and an access network according to any one of the embodiments of the invention.

BRIEF DESCRIPTION OF THE DRAWINGS

The invention will be better understood on reading the following description which is provided by way of completely non-limiting example and with reference to the figures, which show.

In these figures, references that are identical from one figure to another denote elements that are identical or analogous. For the sake of clarity, the elements shown are not to scale, unless stated otherwise.

DETAILED DESCRIPTION OF EMBODIMENTS

Figure 1:
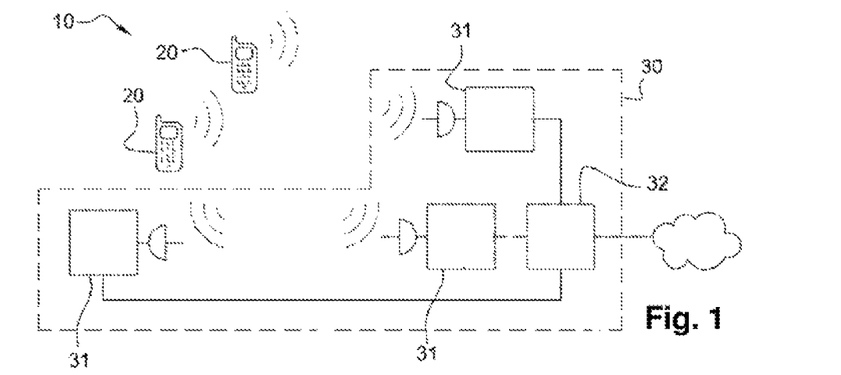
FIG. 1: a schematic representation of a wireless communication system.

FIG. 1 schematically represents a wireless communication system 10, for example of UNB type, including multiple terminals 20 and an access network 30 including multiple base stations 31.

The terminals 20 and the base stations 31 of the access network exchange data in the form of radio signals. The term "radio signal" is understood to mean an electromagnetic wave that is propagated via wireless means, the frequencies of which are comprised in the traditional spectrum of radio waves (a few hertz to several hundred gigahertz).

The terminals 20 are suitable for transmitting uplink messages asynchronously over an uplink to the access network 30. The term "transmit asynchronously" is understood to mean that the terminals 20 autonomously determine when they transmit, without coordination of said terminals 20 with one another and with the base stations 31 of the access network 30.

Each base station 31 is suitable for receiving the uplink messages from the terminals 20 that are within its range. Each uplink message thus received is for example transmitted to a server 32 of the access network 30, potentially accompanied with other information such as an identifier of the base station 31 that received it, the power of said received uplink message, the date of reception of said uplink message, etc. The server 32 processes for example all of the uplink messages received from the base stations 31.

Additionally, the access network 30 is also suitable for transmitting, via base stations 31, downlink messages over a downlink to terminals 20, which are suitable for receiving them. The access network 30 may transmit a downlink message in response to each uplink message received, or else transmit downlink messages only in response to certain uplink messages. For example, the access network 30 may respond only after having received a predefined number of uplink messages from one and the same terminal 20, or respond only to uplink messages including a request to that effect, etc.

For reasons related to the cost of deployment of the access network 30, the base stations 31 are of half-duplex type. Stated otherwise, the base stations 31 may receive uplink messages and transmit downlink messages, but not simultaneously. Thus, each base station 31 may alternatively be set to:

a reception mode, in which said base station 31 may receive uplink messages in a reception window but may not transmit downlink messages;

a transmission mode, in which said base station 31 may transmit downlink messages in a transmission window but may not receive uplink messages.

In the rest of the description, it will be assumed in a non-limiting manner that each terminal 20 is of synchronous reception type. Stated otherwise, each terminal 20 may receive a downlink message only within a predetermined listening window with respect to the last uplink message transmitted by said terminal 20.

Because they do not have to transmit and receive simultaneously, such terminals 20 are, in preferred embodiments, of half-duplex type, in order to decrease manufacturing costs.

The listening window of a terminal 20 may start immediately after having transmitted an uplink message, especially if the response times of the access network 30 are short. However, in preferred embodiments, each terminal 20, after having transmitted an uplink message, is configured to switch to a standby mode for a standby window of predetermined duration that is also known to the access network 30. Conventionally, standby mode is an operating mode that is optimized to decrease power consumption, in which said terminal 20 may in particular neither receive downlink messages nor transmit uplink messages. For example, the duration of the standby window is chosen to be equal to or longer than the minimum response time of the access network 30.

In the rest of the description, it will be assumed in a non-limiting manner that each terminal 20 is configured to switch to standby mode after having transmitted an uplink message.

After the standby window, the terminal 20 leaves standby mode in order to listen to the downlink in the expectation of a downlink message, during a listening window of predetermined duration.

The term "duration of the listening window" is understood to mean the maximum duration for which the terminal 20 is configured to listen to the downlink in the expectation of a downlink message. Thus, if the terminal 20 receives the downlink message before the end of the listening window, it may stop listening to the downlink as soon as the end of the downlink message is reached, even if the listening window has not yet ended. However, the terminal 20 listens to the downlink for as long as no downlink message has been received and as long as the listening window has not ended. At the end of the listening window, the terminal 20 stops listening to the downlink, even if no downlink message has been received. Preferably, the terminal 20 then switches back to standby mode, for example until the transmission of the next uplink message.

It should be noted that, if a terminal 20 is a priori aware that no downlink message will be transmitted by the access network 30 (for example because the uplink message that it transmitted did not include a request to that effect), then said terminal 20 does not listen to the downlink and preferably remains in standby mode, for example until the transmission of the next uplink message.

Advantageously, the duration of the listening window of each terminal 20 is at least five times longer than the duration of the downlink message that said terminal must receive.

Such arrangements make it possible to increase the probability of having listening windows of different terminals 20 which partially overlap. The longer the duration of the listening window the more this probability of overlap increases, such that the duration of the listening windows may advantageously be chosen to be even longer, for example 10 times longer than the duration of the downlink messages, or even more.

In the case that all of the downlink messages that are likely to be transmitted by the access network 30 have the same duration, then the duration of the listening windows is preferably constant, identical for all of the terminals 20.

In the case that downlink messages of different durations are possible, then the duration of a listening window may be dynamically adjusted, for example according to the duration known a priori of the downlink message that must be received. According to another example, the duration of the listening windows is preferably constant, identical for all of the terminals 20, for example chosen to be at least five times longer than the maximum duration of the downlink messages.

In the rest of the description, it will be assumed in a non-limiting manner that all of the downlink messages have the same duration, and that all of the listening windows have the same duration, invariant over time. For downlink messages of less than a second in duration, the duration of the listening window is for example chosen to be between 10 and 30 seconds.

Figure 2:
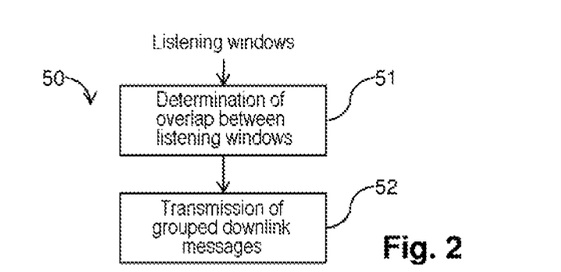
FIG. 2: a diagram illustrating the main steps of a wireless communication method.

FIG. 2 schematically represents the main steps of a wireless communication method 50, which is based on the characteristic according to which the terminals 20 listen to the downlink during a listening window the duration of which is much longer than the duration of the downlink messages.

As illustrated by FIG. 2, when the access network 30 receives multiple uplink messages transmitted by different terminals 20, in response to which downlink messages must be transmitted, the wireless communication method 50 first of all includes a step 51 of determining whether listening windows of terminals 20 expecting downlink messages exhibit overlap.

When there is an overlap suitable for the transmission of multiple downlink messages by one and the same base station 31, the wireless communication method 50 then includes a step 52 of transmitting said downlink messages, grouped together within one and the same transmission window of said base station 31, within said overlap.

In the case (not shown in FIG. 2) that no overlap allowing multiple downlink messages to be transmitted by one and the same base station 31 is identified, said downlink messages are for example transmitted within different transmission windows from one and the same base station 31 and/or from different base stations 31.

Because the duration of the listening windows of the terminals 20 is much longer than the duration of the downlink messages, the probability of having an overlap between listening windows that is suitable for the transmission of multiple downlink messages by one and the same base station 31 is increased. When such an overlap is identified, the corresponding downlink messages are advantageously grouped together and transmitted within one and the same transmission window from said base station 31, thus optimizing the availability of the access network 30 for reception owing to the fact that:

a single base station 31 is switched to transmission mode in order to transmit multiple downlink messages, such that the other base stations 31 remain available for reception;

a single transmission window is configured, at said base station 31, to transmit multiple downlink messages, such that unavailability for reception, linked to toggling between reception mode and transmission mode, is greatly decreased.

The optimization of the availability of the access network 30 for reception is sometimes accompanied by a slight increase in the power consumption of the terminals 20, due to the increase in the duration of the listening windows with respect to the prior art.

In general, the access network 30 may assume that downlink messages may be transmitted by one and the same base station 31 as long as said base station 31 has received all of the uplink messages in response to which these downlink messages must be transmitted. Specifically, the corresponding terminals 20 may then be considered to be within range of said base station 31. Additionally, in order to determine whether an overlap is suitable for the transmission of multiple downlink messages, the duration of said overlap, in particular, is taken into account. However, the relationship allowing it to be determined whether this duration is sufficient for the transmission of multiple downlink messages depends on the strategy under consideration for grouping together said downlink messages.

Figure 3:
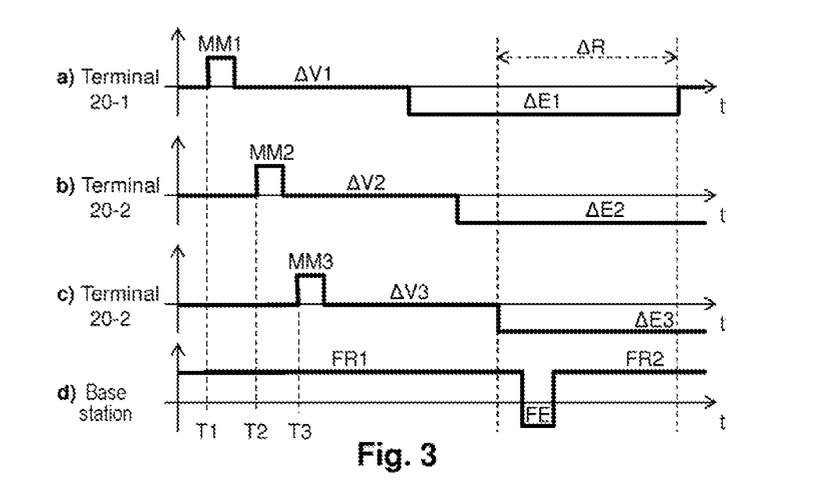
FIG. 3: temporal diagrams illustrating the principle of searching for overlap between listening windows of different terminals.

FIG. 3 schematically represents temporal diagrams illustrating the execution of the step 51 of determining whether listening windows of different terminals exhibit overlap. In the non-limiting example illustrated by FIG. 3, the duration of the standby windows is assumed to be the same for all of the terminals.

The portion a) of FIG. 3 represents a temporal diagram associated with a terminal 20-1, illustrating an uplink message MM1 transmitted at a transmission time T1, as well as the listening window ΔE1 that is predetermined on the basis of said uplink message MM1. More particularly, after having transmitted the uplink message MM1, the terminal 20-1 switches to standby mode for a standby window ΔV1. At the end of the standby window ΔV1, the terminal 20-1 leaves standby mode and listens to the downlink during the listening window ΔE1.

The portion b) of FIG. 3 represents a temporal diagram associated with a terminal 20-2, illustrating an uplink message MM2 transmitted at a transmission time T2. After having transmitted the uplink message MM2, the terminal 20-2 switches to standby mode for a standby window ΔV2, at the end of which said terminal 20-2 listens to the downlink during a listening window ΔE2.

The portion c) of FIG. 3 represents a temporal diagram associated with a terminal 20-3, illustrating an uplink message MM3 transmitted at a transmission time T3. After having transmitted the uplink message MM3, the terminal 20-3 switches to standby mode for a standby window ΔV3, at the end of which said terminal 20-3 listens to the downlink during the listening window ΔE3.

Preferably, the uplink messages MM1, MM2 and MM3 are transmitted at different respective center frequencies FM1, FM2 and FM3, for example determined autonomously by the terminals 20-1, 20-2, 20-3.

As illustrated by FIG. 3, although the uplink messages MM1, MM2 and MM3 have been transmitted at different respective transmission times T1, T2 and T3, the listening windows ΔE1, ΔE2 and ΔE3 exhibit a non-negligible temporal overlap ΔR.

The portion d) of FIG. 3 represents a temporal diagram illustrating the behavior of a base station 31 that has received the uplink messages MM1, MM2 and MM3 within a reception window FR1. Consequently, this base station 31 may transmit downlink messages MD1, MD2 and MD3 to terminals 20-1, 20-2 and 20-3. To this end, a transmission window FE of said base station 31 is configured within the overlap ΔR, in order to transmit said downlink messages. The downlink messages MD1, MD2 and MD3 are for example generated by the server 32, and delivered to the base station 31 in order to be transmitted over the downlink.

As illustrated by the portion d) of FIG. 3, after having transmitted the downlink messages MD1, MD2 and MD3, a new reception window FR2 is configured for said base station 31. Specifically, the base station 31 is preferably configured to be in reception mode by default, in order to decrease the duration for which said base station 31 is unavailable for reception. As such, said base station 31 is switched to transmission mode only when at least one downlink message must be transmitted.

Figure 4:
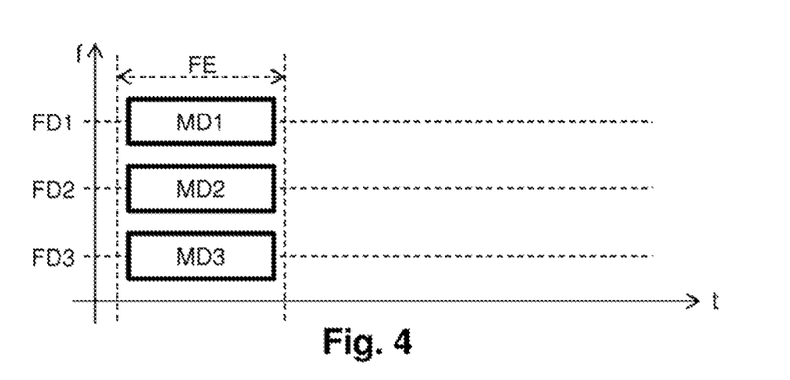
FIGS. 4, 5 and 6: schematic representations of various strategies for grouping downlink messages together within an overlap between listening windows of different terminals.
Figure 5:
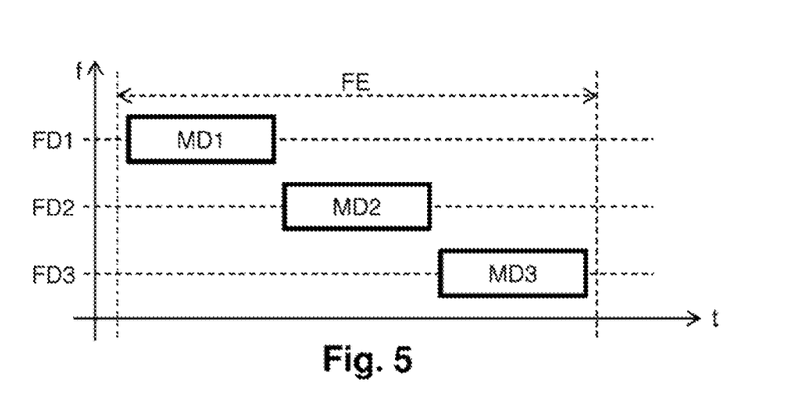
Figure 6:
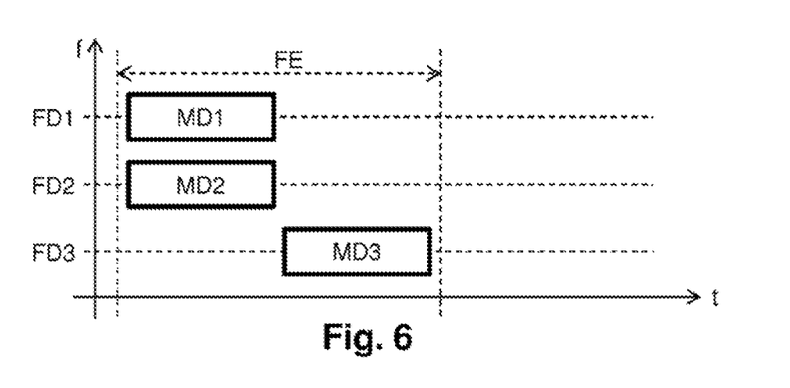

FIGS. 4 to 6 schematically represent non-limiting examples of strategies for grouping together downlink messages MD1, MD2 and MD3 within the transmission window FE of the base station 31.

In the examples illustrated by FIGS. 4 to 6, it will be assumed in a non-limiting manner that the center frequency FD1, FD2, FD3 of each downlink message MD1, MD2, MD3 is determined according to the center frequency FM1, FM2, FM3 of the uplink message MM1, MM2, MM3. For example, the center frequencies FD1, FD2, FD3 are determined according to predefined frequency shifts ΔF1, ΔF2, ΔF3 that are associated with the terminals 20-1, 20-2, 20-3, respectively, according to the following expression:

$$FDi = FMi + \Delta Fi \ (i=1, 2, 3)$$

Each frequency shift ΔF1, ΔF2 and ΔF3 is for example known a priori to the access network 30 and to the corresponding terminal 20-1, 20-2 and 20-3. It should be noted that other rules of correspondence may also be envisaged, as long as they allow both a terminal 20 and the access network 30 to determine the center frequency of a downlink message on the basis of the center frequency of an uplink message transmitted by said terminal.

It is particularly advantageous to determine the center frequency of the downlink message on the basis of the center frequency of the uplink message, since the frequency reference of a terminal 20 may be independent of the frequency reference of the base stations 31 (which may themselves be independent of one another). Additionally, these reference frequencies do not have to be accurate as long as the drift in reference frequencies is small between the transmission/reception of an uplink message and the transmission/reception of the associated downlink message. For example, if the terminal 20-1 transmits an uplink message MM1 at a center frequency FM1' corresponding to (FM1+b1), where b1 corresponds to a bias, then the access network 30, which does not know a priori at which center frequencies the terminals 20 transmit uplink messages, detects this uplink message MM1 and its center frequency is measured by the access network 30 at a value that is substantially equal to FM1'. The terminal 20-1 and the access network 30 both determine the center frequency FD1' at which the downlink message MD1 must be received/transmitted according to the expression:

$$FD1' = FM1' + \Delta F1 = FM1 + \Delta F1 + b1$$

Thus, even though the accuracy at the center frequency FM1 is low because the bias b1 may be high, the center frequency FD1' will be substantially the same on the terminal 20-1 side and on the access network 30 side, in particular because it is determined on the access network side in relation to the measured center frequency FM1' of the uplink message MM1. As such, inexpensive means for synthesizing the reference frequency may be implemented, in particular in the terminals 20.

In the rest of the description, it will be assumed in a non-limiting manner that the frequency shifts ΔF1, ΔF2 and ΔF3 are identical, such that if the center frequencies FM1, FM2, FM3 are different, then the center frequencies FD1, FD2, FD3 are also different.

FIG. 4 represents a first exemplary grouping strategy in which the downlink messages MD1, MD2, MD3 are grouped together in frequency, i.e. transmitted simultaneously at their respective center frequencies FD1, FD2, FD3. The term "transmitted simultaneously" is generally understood to mean that said downlink messages exhibit temporal overlap. In this instance, in the example illustrated by FIG. 4, the downlink messages MD1, MD2, MD3 all have the same duration and are transmitted at exactly the same transmission time, such that the temporal overlap is total. The duration of the transmission window FE, used to transmit three downlink messages MD1, MD2, MD3, may be shortened to the duration of a single downlink message.

Although the terminals 20 transmit asynchronously, i.e. the uplink messages are usually received at different times by the access network 30, it is nonetheless possible to transmit the downlink messages simultaneously by virtue of the fact that the duration of the listening windows is much longer than the duration of the downlink messages.

FIG. 5 represents a second exemplary grouping strategy in which the downlink messages MD1, MD2, MD3 are grouped together temporally, i.e. transmitted in succession, without temporal overlap. In such a case, the decrease in the duration for which the base station 31 is unavailable for reception is mainly linked to the decrease in the number of operations of toggling between reception mode and transmission mode, and due to the fact that the gap between two successive downlink messages may be arbitrarily small.

In order to decrease the duration of unavailability for reception still further, the downlink messages MD1, MD2, MD3 may be transmitted with a bit rate that is higher than the bit rate of the uplink messages, chosen for example so that at least two downlink messages may be transmitted over a duration that is shorter than the maximum duration of an uplink message. More generally, the use of a bit rate over the downlink that is higher than the bit rate over the uplink, at least for certain downlink messages, may be envisaged for each of the grouping strategies.

FIG. 6 represents a third non-limiting exemplary grouping strategy in which the downlink messages MD1, MD2, MD3 are grouped together both in frequency and temporally. More particularly, the downlink messages MD1 and MD2 are grouped together in frequency (transmitted simultaneously at their respective center frequencies FD1 and FD2), and the downlink message MD3 is transmitted after said downlink messages MD1 and MD2, at the center frequency FD3.

Grouping the downlink messages together both in frequency and temporally may for example be necessary in order to comply with regulatory constraints in terms of maximum transmission power in the frequency band under consideration. In such a case, grouping in frequency is favored while the total instantaneous power of the downlink messages that are grouped together in frequency is lower than said maximum power. If it is not possible to group all of the downlink messages together in frequency, then some downlink messages may be grouped together in frequency and the other downlink messages may be transmitted afterward, potentially grouped together with one another in frequency. It is possible to control the instantaneous power of each downlink message in order to limit it to the strict minimum and thus to maximize the number of downlink messages that may be grouped together in frequency.

More generally, it should be noted that the embodiments and modes of implementation considered above have been described by way of non-limiting examples, and as such other variants may be envisaged.

In particular, the invention has been described under the assumption of a wireless communication system 10 including only synchronous reception terminals 20. However, according to other examples, there is nothing to rule out synchronous reception terminals 20 and asynchronous reception terminals, i.e. terminals suitable for receiving downlink messages at any time, coexisting.

In such a case, when a downlink message must be transmitted to an asynchronous reception terminal, the method 50 includes steps (not shown in the figures) of:
  determining whether said downlink message may be transmitted by a base station 31 scheduled for transmitting a downlink message in response to an uplink message transmitted by a synchronous reception terminal 20;
  when said downlink message intended for the asynchronous reception terminal may be transmitted by the base station 31 scheduled for transmitting a downlink message to a synchronous reception terminal: said downlink messages, grouped together within one and the same transmission window, are transmitted from said base station 31.

The invention claimed is:

1. A method for wireless communication between a plurality of terminals and an access network, the terminals asynchronously transmitting uplink messages over an uplink to the access network, the access network is configured to transmit downlink messages over a downlink in response to all or some of the uplink messages, the access network including a plurality of base stations are configured to transmit downlink messages within transmission windows in which said base stations are not able to receive the uplink messages, wherein each terminal awaiting a downlink message in response to a transmitted uplink message is configured to listen to the downlink during a listening window that is predetermined with respect to an uplink message, a duration of the listening window is at least five times longer than a duration of the downlink message, the method comprises steps of:
  determining whether listening windows of terminals awaiting downlink messages exhibit overlap; and
  in response to a determination that there is an overlap suitable for transmission of multiple downlink messages by one and same base station, transmitting the downlink messages, grouped together within one and same transmission window of one and the same base station, within the overlap.

2. The method as claimed in claim 1, wherein at least two downlink messages of the transmitted downlink messages grouped together within one and the same transmission window of one and the same base station are transmitted simultaneously at different respective center frequencies.

3. The method as claimed in claim 2, wherein a center frequency of a downlink message transmitted in response to an uplink message is determined according to the center frequency of the uplink message.

4. The method as claimed in claim 1, wherein at least two downlink messages of the transmitted downlink messages grouped together within one and the same transmission window of one and the same base station are transmitted in succession.

5. The method as claimed in claim 1, wherein the downlink messages grouped together within one and the same transmission window of one and the same base station are grouped together in frequency by being transmitted simultaneously at different respective center frequencies as long as a total instantaneous power of the downlink messages grouped together in frequency is lower than a predefined maximum power, and the downlink messages are then grouped together temporally by being transmitted in succession in response to a determination that the total instantaneous power of the downlink messages grouped together in frequency are higher than the predefined maximum power, such that the total instantaneous power remains lower than the predefined maximum power over a duration of one and the same transmission window.

6. The method as claimed in claim 1, wherein at least one downlink messages of the transmitted downlink messages grouped together within one and the same transmission window of one and the same base station is transmitted with a bit rate that is higher than a bit rate of the uplink message in response to which said at least one downlink message is transmitted.

7. The method as claimed in claim 1, wherein a wireless communication system comprises multiple asynchronous reception terminals which are configured to receive the downlink messages at any time, the method further comprises, in response to a determination that a first downlink message must be transmitted to an asynchronous reception terminal, steps of:
  determining whether the first downlink message is transmittable by a base station scheduled to transmit a second downlink message in response to an uplink message transmitted by a synchronous reception terminal; and
  in response to a determination that the first downlink message for the asynchronous reception terminal is transmittable by the base station scheduled to transmit the second downlink message to the synchronous reception terminal, transmitting the first downlink message and the second downlink message, grouped together within a same transmission window, from the base station.

8. A terminal of a wireless communication system, the terminal is configured to transmit uplink messages over an uplink to an access network, said access network comprises a plurality of base stations that are configured to transmit radio signals within transmission windows in which said base stations are not able to receive the radio signals, said access network is configured to transmit downlink messages over a downlink to the terminal in response to all or some of the uplink messages; wherein the terminal, upon transmission of an uplink message in response to which said access network must transmit a downlink message, is configured to listen to the downlink to receive the downlink message, during a listening window that is predetermined with respect to the uplink message; wherein a duration of the listening window is at least five times longer than a duration of the downlink message; and wherein the access network is configured to: determine whether listening windows of terminals awaiting downlink messages exhibit an overlap; and in response to a determination that there is an overlap suitable for transmission of multiple downlink messages by one and same base station, transmitting the downlink messages, grouped together within one and same transmission window of one and the same base station, within the overlap.

9. The terminal as claimed in claim 8, wherein the terminal, upon transmission of the uplink message in response to which said access network must transmit the downlink message, is configured to switch to a standby mode for a standby window of a predetermined duration, and after the predetermined duration of the standby window, is configured to listen to the downlink during the listening window.

10. An access network of a wireless communication system comprising a plurality of base stations that are configured to transmit radio signals within transmission windows in which said base stations are not able to receive the radio signals,
  the wireless communication system comprises a plurality of terminals, each terminal is configured to transmit uplink messages over an uplink to an access network,
  said access network is configured to transmit downlink messages over a downlink to the terminal in response to all or some of the uplink messages;
  wherein the terminal, upon transmission of an uplink message in response to which said access network must transmit a downlink message, is configured to listen to the downlink to receive the downlink message, during a listening window that is predetermined with respect to the uplink message;
  wherein a duration of the listening window is at least five times longer than a duration of the downlink message;
  wherein said plurality of terminals asynchronously transmits the uplink messages over the uplink of the access network; and
  wherein the access network is configured to:
    determine whether listening windows of terminals awaiting downlink messages exhibit an overlap; and
    in response to a determination that there is an overlap suitable for transmission of multiple downlink messages by one and same base station, transmitting the downlink messages, grouped together within one and same transmission window of one and the same base station, within the overlap.

11. The access network as claimed in claim 10, wherein at least two downlink messages of the transmitted downlink messages grouped together within one and the same transmission window of one and the same base station are transmitted simultaneously at different respective center frequencies.

12. The access network as claimed in claim 11, wherein a center frequency of a downlink message transmitted in response to an uplink message is determined according to the center frequency of the uplink message measured by the access network.

13. The access network as claimed in claim 10, wherein at least two downlink messages of the transmitted downlink messages grouped together within one and the same transmission window of one and the same base station are transmitted in succession.

14. The access network as claimed in claim 10, wherein each base station is configured to operate by default in a reception mode, in which the uplink messages are receivable by said each base station but the downlink messages are not transmittable by said each base station.

15. A wireless communication system comprising the access network as claimed in claim 10.

* * * * *